June 9, 1936.  H. ASCHENBORN  2,043,503
DEVICE FOR PRODUCING PLASTIC REPRODUCTIONS OF CORPOREAL FORMS
Filed Feb. 6, 1936
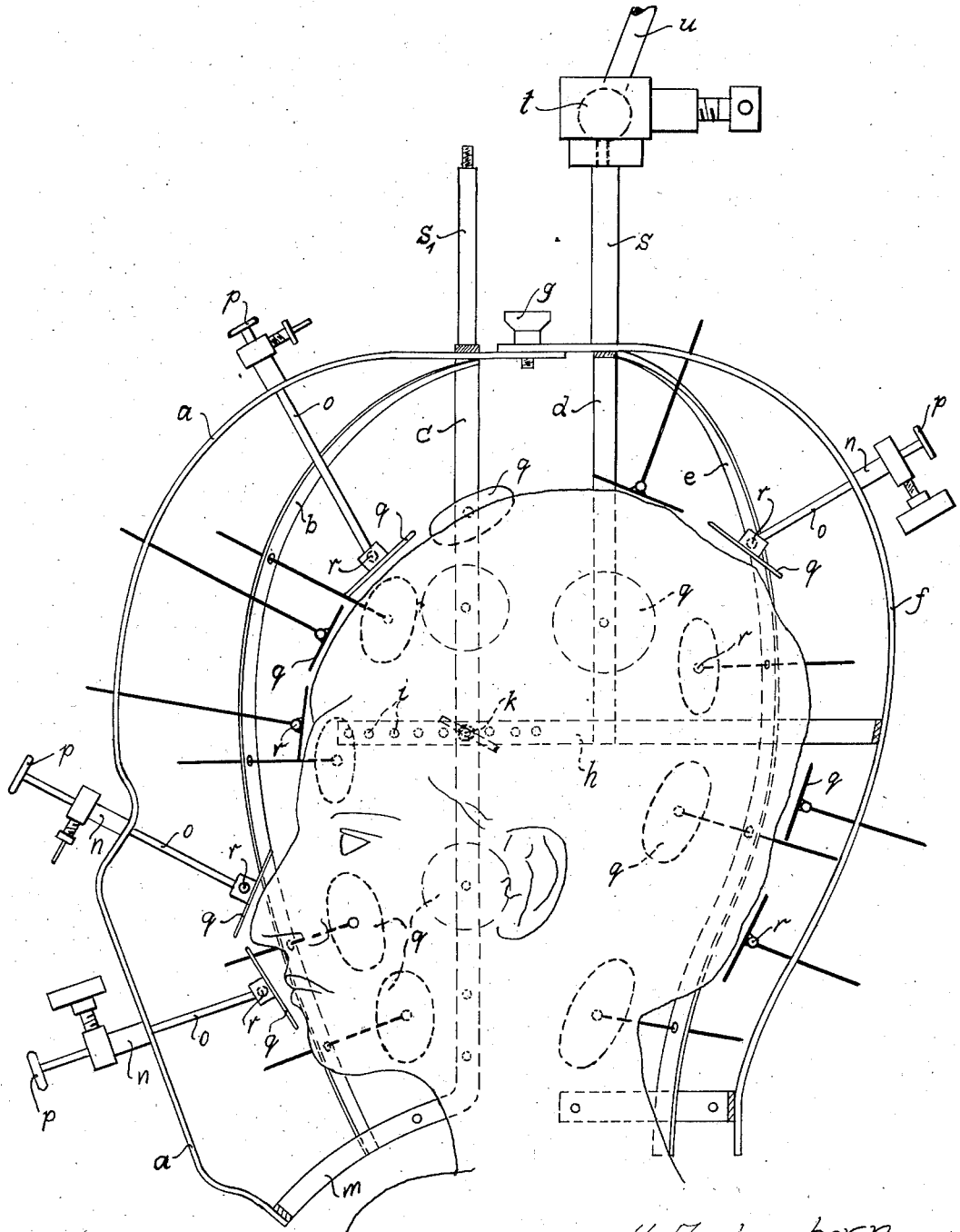

Patented June 9, 1936

2,043,503

UNITED STATES PATENT OFFICE 2,043,503

DEVICE FOR PRODUCING PLASTIC REPRODUCTIONS OF CORPOREAL FORMS

Helmut Aschenborn, Coblenz-on-the-Rhine, Germany

Application February 6, 1936, Serial No. 62,675
In Germany July 30, 1934

3 Claims. (Cl. 18—5)

This invention relates to a device for producing plastic reproductions of corporeal forms, more particularly human heads, by means of a plastic and hardening mass which is applied to the form to be reproduced. According to the invention there is placed around the form to be reproduced and the applied plastic mass at a certain distance therefrom a basket-like framework consisting of bows corresponding to the form, in which supporting rods directed normally to the surface of the body, from which a mould is to be obtained, are held so as to be capable of sliding and of being fixed, which rods carry at their inner ends plates which are supported in ball and socket joints and are brought up to the external surface of the moulding mass and are connected to it.

Devices for producing plastic reproductions are known, in which around the body to be reproduced there is disposed at a certain distance therefrom a framework, in which supporting rods directed substantially normally to the surface of the body are held so as to be capable of sliding and of being fixed, which carry at their ends pivotally mounted plates which are brought up to the outer surface of the mould.

In contradistinction thereto the invention consists in this, that there is placed around the body to be reproduced at a certain distance therefrom a basket-like framework made of suitably shaped bows, in which supporting rods normal to the surface of the body are held so as to be capable of sliding and of being fixed, which rods carry at their inner ends plates which are supported in ball and socket joints and are brought up to the external surface of the mould and are connected to it. It is assumed, that the process is one in which plastic reproductions are made by means of moulds of a plastic mass which is made fluid and then hardens and which is applied to the body to be reproduced. This assumption does not however hold good with the known devices. In one of these known devices no plastic mould of the natural body part is formed, so that no means for supporting a plastic mass are in question. It is only a matter of measuring the body part, for instance foot, at various points which are interconnected by straight or curved lines. The adjustable pins used for this purpose are set to the surface of the foot and are clamped in that position. A plastic mass could not in this way be supported, as for this purpose a suitable surface at the ends of the pins is lacking. In removing the mass the pins would be drawn out of it.

Another known arrangement for modelling and measuring the body part, for instance the foot, is very similar to the known fitters or conformators, commonly used in hat shops, with laterally adjustable members which, after being adjusted, can be fixed to conform to the shape of the head. Such an arrangement differs entirely from that according to the invention, as in this case no plastic mould is formed and consequently no plastic mass has to be supported.

A further known device serves the purpose of obtaining the shape of the human foot for the purpose of manufacturing suitable insertions for footwear. In this case as well no plastic mould in the same sense as in the invention is formed and there is therefore no similar supporting of the plastic modelling mass. Only a rubber cloth is pressed by an air or water cushion against the sole of the foot, the cloth having been previously coated with a plastic mass which subsequently hardens. In this case, therefore, a plastic mass is not applied freely to the body part and supported by suitable members, as in the device according to the invention.

Another known device serves the purpose of obtaining an impression of a strip of the face for dental purposes. With this object the plastic mass is placed in bows having a U-shaped cross-section, which are bent to conform to the contours of the face and are brought up against the latter. Suitable holders with adjustable members are used for holding these bows. This arrangement is entirely different from that according to the invention, for obviously it would not be possible to obtain the same result with these known means. The adjustable members of the holder and support of the bow formers are rigidly connected to the bows themselves; they are not therefore in contact with the plastic mass and thus do not serve for supporting the latter by means of plates which are capable of universal movement. According to the invention the entire head is coated with the plastic mass and the function of the adjustable pins with the universally movable plates is to support the plastic mass and to prevent a distortion or warping thereof. As the proportions of the various faces and much more so of the various figures differ considerably, it would be necessary, when using the known device, to have available a great selection of pre-shaped channels. But, even then only strips could be moulded in every case. On the other hand, the device according to the invention is capable of being used for any and every shape of head or figure and embraces the entire surface.

For obtaining a mould of a human head, for instance, it is of special importance, on the one hand, that the time required for the sitting of the person to be modelled shall be shortened as far as possible and, on the other hand, that the soft parts of the face and the arrangement of the hair shall not be deformed at all. For the latter reason the layer first applied must be very thin. This layer is the actual modelling layer and all further steps are taken with a view to supporting this layer. If it should be attempted to support the layer by the application of further modelling mass, an unnecessarily large quantity of mass would be used and the weight and the time taken for hardening would become too great for the person being modelled. For this reason it has already been proposed to embed pieces of wire in the second and third layer of the modelling mass. These pieces of wire fulfilled their purpose all the better, the more closely they conform to the first layer. Hence it was necessary to bend these pieces of wire to the correct shape in each case, which required much time. On the other hand, they had to be as thick as possible, so as to act as an efficient support and so as not to cut or tear the mould when it was being removed. Finally, the pieces of wire have been rigidly connected with one another by sockets and clamping screws, the number of pieces of wire being thus reduced, but not much time being saved. By these expedients the old disadvantages were partly reduced, it is true, but fresh ones were added. The network became less dense, which had to be compensated for by more mass. In none of these ways has it so far been possible to find a system of rigid supports which could be made to conform to the individual shape of head rapidly, accurately and with respect to one another to a sufficient degree. A further great disadvantage has been that the weight of the entire mould, frequently over 20 lbs. had to be supported by the model.

The invention enables the modelling layer to be kept very thin almost everywhere and therefore to harden rapidly and to be applied to even soft coiffures practically without causing deformation thereof, so that the entire weight of the mould can be supported by a stand.

In the accompanying drawing there is illustrated by way of example a supporting framework, such as will serve for the plastic reproduction of human heads. The framework is shown in a vertical central section as viewed from the inside towards one lateral half. The other half is constructed in the same way and to be imagined as connected to that shown in the central plane. The head to be reproduced is so disposed within this framework that the nose lies in the plane of the drawing to the left and the back of the head to the right, approximately so as to correspond to the outer contours of the bows shown.

a, b, c, d, e, and f are the bows of the framework, extending in vertical planes as they follow one another in the right-hand half of the framework from front to back. The front bow a extends from the crown of the head over the forehead, the nose and the chin to the throat. The rear bow f extends from the crown of the head over the back of the head to the back of the neck. The bows a, b, and c form together with the corresponding bows of the left-hand side of the face, the front part of the framework, while the bows d, e, and f together with the corresponding bows of the left-hand half form the rear part. The front and the rear part of the framework are adjustably connected together at the apex and about in the middle horizontal plane. For this purpose the ends of the two bows a and f overlap at the apex, where they are held together by a screw g. The overlapping ends have a number of holes for enabling them to be set to the correct distance apart. The bows d, e, and f of the rear part of the framework are firmly connected by a middle horizontal bar h. The two free ends of the bar h lead at either side to the bow c and are adjustably connected to the latter. For this purpose the free ends of h are provided with a number of adjusting holes i, in which the fixing screws k engage.

Below the chin and around the neck the bows c extend on either side from their lower ends in an arc of a circle m to the centre bow a.

In all the bows are provided at convenient distances apart holes, at which guiding sockets n are fixed for receiving the radial supporting rods o. So as not to make the drawing unclear, only a few of the rods are shown complete, the others being only indicated diagrammatically by dot-and-dash centre lines. The rods o are provided at the outer ends with heads or discs p for adjusting them by hand. At the inner ends of the rods o sheet metal discs q of different sizes are disposed, which are connected to the rods by ball and socket joints r. In this way the discs q can be brought into any desired position and thus always to bear against the outer surface of the plastic mould so as to be connected with it. For supporting this mould about 50 rods in all are provided.

After the mould has been completed and is hardened it is divided in the transverse direction into two parts. The framework is opened by releasing the screw g at the apex and the connecting screws k on every side, in order to release the head, from which the reproduction is being made, from the mould. The parts of the mould are then put together again and are connected by the screws of the framework. The mould can then be placed on its head and filled with the casting material, in order to obtain the reproduction.

In order easily to hold the framework in suspension, while work is proceeding, a supporting bar s is fixed to the bows at the top and behind the apex, which bar is suspended from a ball and socket joint t which is capable of being clamped and is supported by a further bar u which is suspended by its end which is shown broken away in the drawing to a fixed point in any suitable way, for instance at the forward end of a gallows-like stand. In cases, in which only the front half of the face is to be reproduced, the rear part of the framework is not required and can be removed. In this case a supporting bars s¹ is also provided on the front part of the framework in front of the apex g, which bar is connected to the suspending device and the ball and socket joint t.

What I claim is:

1. A device for making plastic reproductions of corporeal forms, more particularly human heads, by means of a plastic and hardening mass to be applied to the form to be reproduced, comprising in combination a basket-like framework adapted to be disposed around the form to be reproduced and the applied plastic modelling mass, consisting of bows shaped to correspond to the said form, rods held in the said bows normal to the surface of the form to be reproduced, means for adjusting the said rods, means for fixing them in position, ball and socket joints at the inner ends of the said rods and plates mounted on the said ball and socket joints, which are adapted to be brought up to and connected with the outer surface of the plastic modelling mass.

2. A device as claimed in claim 1, and in which the basket-like framework for carrying the supporting rods is capable of being taken apart and put together again along with the plastic mould in such a manner that the plastic mould together with the associated parts of the framework can be removed from the form to be reproduced and subsequently joined together again.

3. A device as claimed in claim 1 and comprising a ball and socket arrangement for freely suspending the basket-like framework.

HELMUT ASCHENBORN.